United States Patent
Nowell et al.

(10) Patent No.: US 7,222,467 B2
(45) Date of Patent: May 29, 2007

(54) SCREEN WITH INTEGRAL RAILING

(75) Inventors: Jeffrey A. Nowell, Hudson, OH (US); Jerry D. DeLiberato, Twinsburg, OH (US); Tony P. Bouquot, Hudson, OH (US)

(73) Assignee: Patio Enclosures Inc., Macedonia, OH (US)

( * ) Notice: Subject to any disclaimer, the term of this patent is extended or adjusted under 35 U.S.C. 154(b) by 311 days.

(21) Appl. No.: 10/675,442

(22) Filed: Sep. 30, 2003

(65) Prior Publication Data

US 2005/0066610 A1 Mar. 31, 2005

(51) Int. Cl.
*E04C 2/38* (2006.01)

(52) U.S. Cl. .................. 52/656.7; 52/656.4; 52/656.9; 52/455; 160/27; 160/28; 160/273.1; 160/290.1

(58) Field of Classification Search .................. 52/202, 52/203, 653.1, 656.1, 656.7, 656.8, 676, 52/455, 656.4, 222, 656.9; 160/371, 392, 160/395, 369, 370, 379, 27, 28, 273.1, 290.1
See application file for complete search history.

(56) References Cited

U.S. PATENT DOCUMENTS

| | | | |
|---|---|---|---|
| 1,022,547 A | 4/1912 | Hansen | |
| 1,641,523 A | 9/1927 | Bell | |
| 1,791,680 A * | 2/1931 | Miller | 52/690 |
| 2,837,153 A | 6/1958 | Brown et al. | |
| 3,052,291 A | 9/1962 | Fellers | |
| 3,333,373 A | 8/1967 | Taylor et al. | |
| 3,819,246 A | 6/1974 | List | |
| 3,822,053 A * | 7/1974 | Daily | 256/22 |
| 3,918,686 A * | 11/1975 | Knott et al. | 256/59 |
| 4,480,676 A * | 11/1984 | Solomon | 160/272 |
| 4,735,023 A | 4/1988 | Posner | |
| 4,739,594 A | 4/1988 | Langford et al. | |
| 5,046,546 A | 9/1991 | Benedyk et al. | |
| 5,134,813 A | 8/1992 | Betts | |
| D361,629 S | 8/1995 | Tweedt | |
| 5,465,539 A * | 11/1995 | Rose | 52/204.53 |
| 5,653,178 A * | 8/1997 | Huczka | 108/47 |
| D402,376 S | 12/1998 | St. Gelais et al. | |
| 6,029,954 A * | 2/2000 | Murdaca | 256/59 |
| 6,082,432 A * | 7/2000 | Kissinger | 160/290.1 |
| 6,250,040 B1 * | 6/2001 | Green | 52/656.7 |
| 6,618,998 B1 * | 9/2003 | Thomas et al. | 52/63 |
| 2004/0168379 A1 * | 9/2004 | Chen | 52/202 |

* cited by examiner

*Primary Examiner*—Jeanette E. Chapman
*Assistant Examiner*—Yvonne M. Horton
(74) *Attorney, Agent, or Firm*—Fay, Sharpe, Fagan, Minnich & McKee, LLP

(57) ABSTRACT

A frame assembly for at least partially enclosing a raised floor structure includes a bottom frame member positioned adjacent an associated raised floor structure. A pair of spaced apart side frame members are connected to and extend upwardly from the bottom frame member. A top frame member is spaced from the bottom frame member and connected to the pair of side frame members. At least one picket extends between and is connected to the top and bottom frame members. The at least one picket is oriented approximately parallel to the side frame members. A screen is selectively mounted to at least one of the top and bottom frame members and the side frame members. The screen is located adjacent the at least one picket.

26 Claims, 7 Drawing Sheets

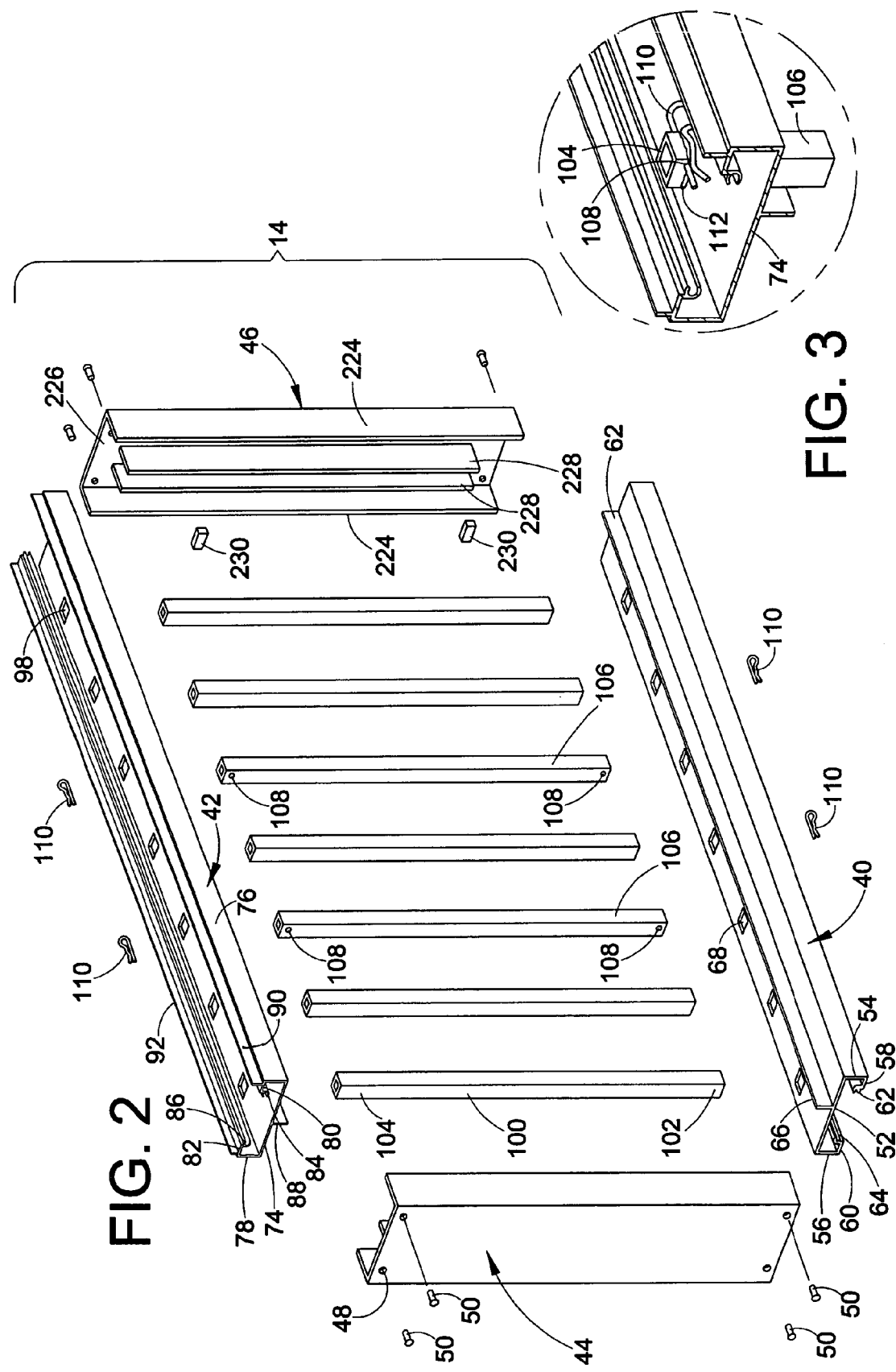

SCREEN WITH INTEGRAL RAILING

BACKGROUND OF THE INVENTION

1. Field of the Invention

The present invention generally relates to a frame assembly. More particularly, the present invention relates to a screened frame assembly having an integral railing for at least partially enclosing a raised floor structure. The present invention finds particular application as a modular or sectional frame assembly that can be combined with or interconnected to one or more other frame assemblies for walling off an open side of a raised floor structure such as an elevated deck on a house or commercial building. It is to be appreciated, however, that the present invention may also be amenable for other applications.

2. Discussion of the Art

Many home and business owners desire to have their outdoor floor structures, such as decks, porches, patios and the like, "screened-in" to prevent or reduce the likelihood of insects, small debris and the like from interfering with individuals using the outdoor floor structure. Thus, a screened-in porch or deck allows the enjoyment of the outdoors without some of the usual nuisances that often accompany the outdoors. As used herein, "screened-in" and "screen-in" refer to the application of a screen, mesh or the like to open areas surrounding a floor structure.

Screening-in may be done on newly constructed outdoor floor structures or as a retrofit application on preexisting floor structures. In either case, cost and efficiency improvements are always desirable, particularly as they relate to the manufacture and installation of materials or products used to screen in a floor structure. In response to the desirability of such improvements, the building industry has developed and made available many modular-type products that allow screened-in frame structures to be factory assembled, delivered in their assembled state and quickly installed. The quick installation of factory assembled modular products greatly reduces the cost of screening-in an outdoor floor structure compared to traditional method of custom building the screened in framework at the site of the outdoor floor structure.

Although many modular-type products are available for screening in, heretofore, these products were not suitable for screening in a raised or elevated floor structure. More particularly, many local municipalities have building codes or ordinances that require certain raised floor structures to have railings or guard rails along their exposed edges, i.e., those edges lacking some other barrier and not leading to a set of stairs or the like. The ordinances often specify that a particular raised floor structure requires a railing if the floor structure is raised or elevated a specified distance relative to the ground or surface below the raised floor structure.

Often, the mandated railings are specifically required to include a barrier between the top of the railing and the floor structure. A suitable barrier could be, for example, a plurality of vertically extending posts extending between a top member of the railing and a base member of the railing or the floor structure itself. The railing requirement is intended to lessen the likelihood of an injury resulting from someone falling over the edge of the raised floor structure.

Generally, conventional modular products for screening in an outdoor floor structure do not include a railing or guard rail with a barrier and, as a result, are unsuitable for screening in a raised floor structure. Accordingly, there is a need for a screen assembly that can be factory assembled and quickly installed on site wherein the screen assembly includes an integral railing or guard rail assembly having a barrier between the top of the railing and the floor structure.

Desirably, the barrier on such a screen assembly should be minimal and not more than is necessary to meet the legal requirements calling for the barrier. For example, if the barrier were a sheer wall, it would at least partially defeat the purpose of screening in the outdoor floor structure because the wall would not allow a user of the floor structure to fully enjoy the outdoors because the wall would obstruct visibility and airflow. At the same time, the barrier should be sturdy enough to resist damage or breakage when a force is applied to the barrier or the entire screen assembly such as when a person leans thereagainst.

A design for enclosing a floor structure that is not minimal is disclosed in U.S. Design Pat. No. 402,376. The '376 patent illustrates a screen assembly for use in a gazebo. A lower section of the screen assembly includes a lattice-type panel having a plurality of diamond-shaped holes extending therethrough. By nature of the large amount of surface area occupied by the lattice-type panel, the screen assembly of the '376 patent will overly obstruct visibility and airflow. A further problem is that the lattice-type panel is likely not sturdy enough to serve as an effective barrier as the panel appears to have a relatively small thickness and no anchoring means for securely attaching the panel to the frame of the screen assembly. Thus, the needs articulated above are not met by the screen assembly of the '376 patent.

Other features that would be desirably incorporated into a screen assembly include the use of removable screens. These would make the screen assembly easier to maintain over its lifetime by enabling relatively easier cleaning, repairing and replacement of the screened portion of the screen assembly. Still further features that are desirable include the use of components or compounds that reduce or limit the screen assembly from creating noise such as rattling in the wind and components that are specifically configured to provide relatively quick and easy on-site assembly of the screen assembly.

SUMMARY OF THE INVENTION

The present invention provides a new and improved frame assembly that overcomes the foregoing difficulties and others and provides the aforementioned and other advantageous features. More particularly, in accordance with one aspect of the present invention, a frame assembly for at least partially enclosing a raised floor structure is provided. In accordance with this aspect of the present invention, the frame assembly includes a bottom frame member positioned adjacent an associated raised floor structure. A pair of spaced apart side frame members are connected to and extend upwardly from the bottom frame member. A top frame member is spaced from the bottom frame member and connected to the pair of side frame members. At least one picket extends between and is connected to the top and bottom frame members. The at least one picket is oriented approximately parallel to the side frame members. A screen is selectively mounted to at least one of the top and bottom frame members and the side frame members. The screen is located adjacent the at least one picket.

According to another aspect of the present invention, a screen assembly having an integral railing is provided. More particularly, in accordance with this aspect of the invention, the screen assembly includes a lower rectangular frame section having a base member and a top member spaced from the base member. A plurality of spaced barrier members extend from the base member to the top member. The spaced barrier members and the top member together form a railing. A first screen is held in the lower rectangular frame section adjacent the railing. An upper rectangular frame section is supported by the lower rectangular frame. A second screen is held in the upper rectangular frame section.

According to yet another aspect of the present invention, a combination screen and railing frame assembly is provided. More particularly, in accordance with this aspect of the invention, the combination screen and railing frame assembly includes a frame defining an opening therethrough. At least one screen is secured to the frame and extends across at least part of the opening. A balustrade is connected to the frame. The balustrade includes a horizontal member extending across the opening and is spaced a preselected distance from a bottom portion of the frame. A plurality of spaced pickets extends across at least part of the opening. Each of the plurality of spaced pickets is connected at one end to the horizontal member and at another end to the bottom portion of the frame.

According to still another aspect of the present invention, a frame assembly is provided for screening in a floor structure and providing an integral rail therewith. More particularly, in accordance with this aspect of the invention, the frame assembly includes a bottom frame section and a first pair of spaced apart side frame sections extending upwardly from the bottom frame section. A first intermediate frame section is spaced from the bottom frame section and extends between the first pair of side frame sections. A plurality of spaced pickets extends between the bottom frame section and the first intermediate frame section. The plurality of pickets and the first intermediate frame section form a rail. A first removable screen panel is held between the bottom frame section, the first side frame sections and the first intermediate frame section. The first screen panel is disposed on one side of the plurality of pickets. A second intermediate frame section is connected to the first intermediate frame section and further forms the rail. A second pair of spaced apart side frame sections extend upwardly from the second intermediate frame section. A top frame section connects to the second pair of side frame sections. A second removable screen panel is held between the second intermediate frame section, the second pair of side frame sections and the top frame section.

According to still yet another aspect of the present invention, a method of assembling a frame assembly having a screen and a railing is provided. More particularly, in accordance with this aspect of the invention, the method includes having first ends of a plurality of pickets inserted into a first plurality of spaced opening on a bottom frame member. Second ends of the plurality of pickets are inserted into a second, aligned plurality of spaced openings on a top frame member. A first side frame section is attached to the bottom frame member and the top frame member adjacent a first one of the plurality of pickets. A second side frame section is attached to the bottom frame member and the top frame member adjacent a last one of the plurality of pickets.

BRIEF DESCRIPTION OF THE DRAWINGS

The invention may take physical form in various components and arrangements of components, and in various steps and arrangements of steps. The drawings are only for purposes of illustrating a preferred embodiment and are not to be construed as limiting the invention.

FIG. 2 is an exploded perspective view of a lower rectangular frame section of the frame assembly of FIG. 1;

FIG. 3 is an enlarged partial perspective view of a connection between one of a plurality of spaced pickets in the lower frame section and a top member of the lower frame section;

DETAILED DESCRIPTION OF THE PREFERRED EMBODIMENT

Figure 1:
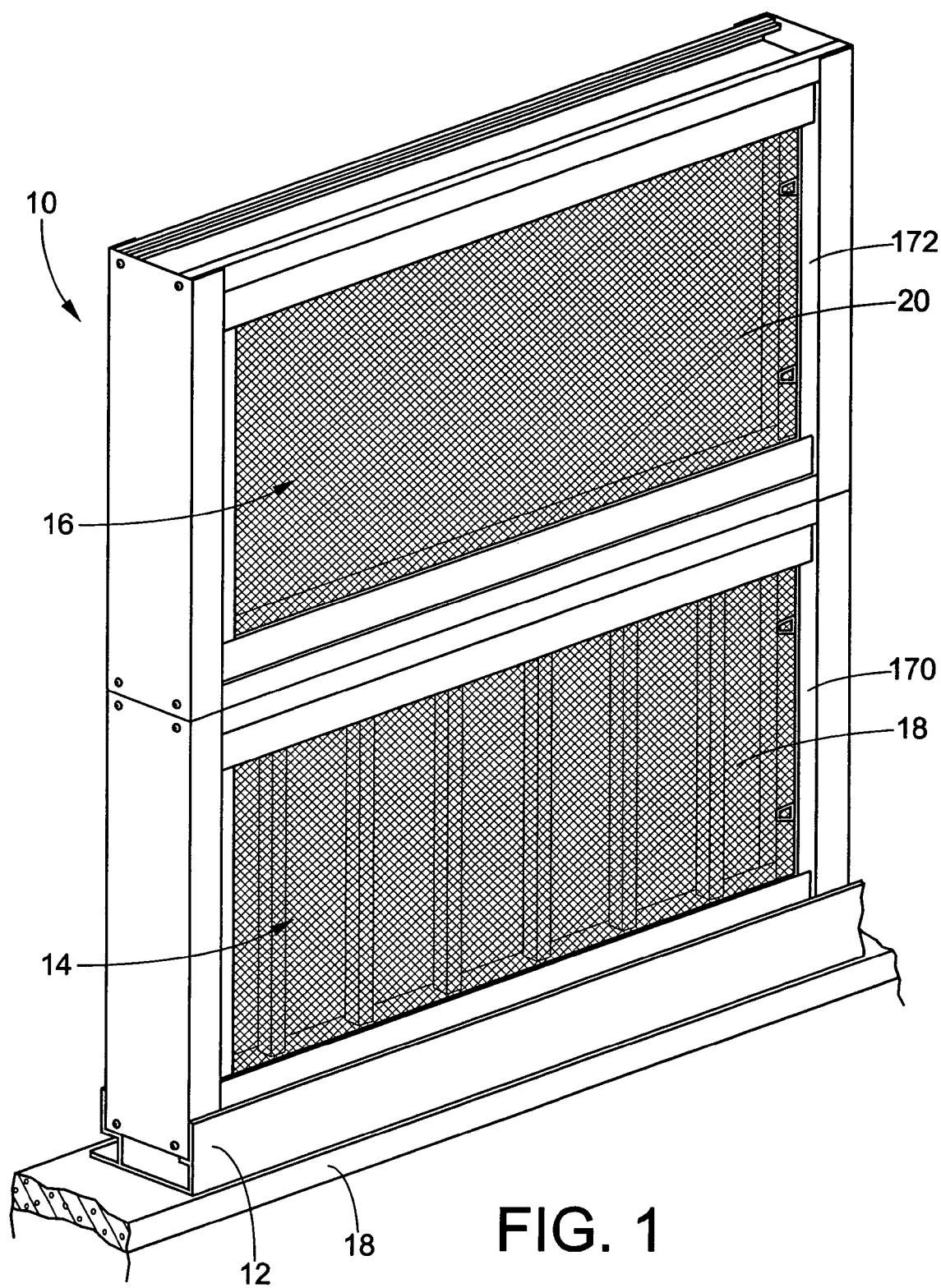
FIG. 1 is a perspective view of a frame assembly in accordance with a preferred embodiment of the present invention.

Referring now to the drawings wherein the showings are for purposes of illustrating a preferred embodiment of the invention only and not for purposes of limiting the same, and like reference numerals are used to indicate like or corresponding parts throughout the several Figures, FIG. 1 shows a frame assembly generally designated by reference numeral 10. In one application, the frame assembly 10 can be used to "screen-in" a raised floor structure, such as a deck, porch or the like and simultaneously provide a code-compliant railing about at least a portion of a perimeter of said raised floor structure, as will be described in more detail below.

As illustrated, the frame assembly 10 of the preferred embodiment forms a generally rectangular frame that defines an opening therethrough. More specifically, the frame assembly 10 includes a floor expander or support bas 12, a lower frame section 14 and an upper frame section 16. The lower section 14 defines a lower opening 18 and, likewise, the upper section defines an upper opening 20. The rectangular frame sections 14, 16 can be independently assembled and, after being assembled, connected to the support base 12 and to one another to form the relatively larger rectangular frame 10 shown in FIG. 1, as will be described in more detail below.

Figure 7:
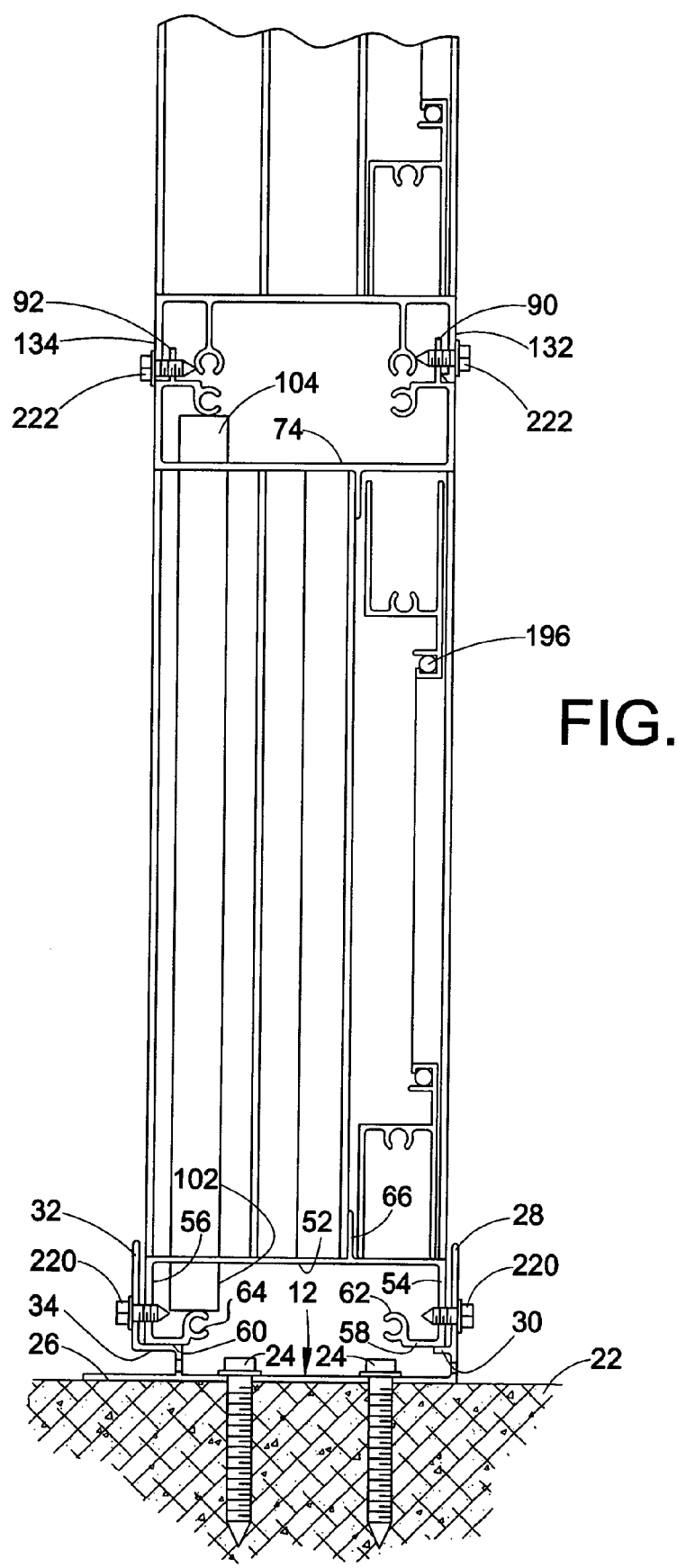
FIG. 7 is a partial elevational cross-sectional view of the frame assembly of FIG. 1 showing the lower section mounted to a supporting surface.

With additional reference to FIG. 7, the support base 12 is secured to a supporting surface or structure 22 via bolts 24. More specifically, the support base 12 includes a base wall 26 for resting upon the supporting structure 22. The support base further includes a front wall 28 having a flange 30 extending therefrom for supporting the lower frame section 14 and a rear wall 32 having a shoulder portion 34 for further supporting the lower frame section 14. When supported by the support base 12, the lower frame section 14 is partially nested in the front and rear walls 28,32.

With additional reference to FIG. 2, the lower section 14 includes a kneewall bottom or bottom member 40 and a top member 42 spaced apart from the bottom member. The lower section 14 further includes a pair of spaced apart side members 44,46 extending between the top and bottom frame members 40,42. The side members 40,42 include holes 48 that allow the side members to be secured to the top and bottom members 40,42 by suitable conventional fasteners 50, which can be screws, rivets, bolts, or the like.

More particularly, the bottom member 40 is generally elongated and includes a main wall 52 and a pair of face walls, front face wall 54 and rear face wall 56, depending downwardly from respective front and rear edges of the main wall 52. The bottom member further includes a pair of support walls, front support wall 58 and rear support wall 60, extending toward one another from distal edges of the downwardly depending walls 54,56. At distal ends of the support walls 58,60, fastener receiving structures 62,64 are provided for receiving the fasteners 50. A flange 66 extends upwardly from the main wall 48. A plurality of spaced holes 68 is defined on a portion of the main wall 52 between the flange 66 and the rear face wall 56.

Except as indicated herein, the top member 42 is generally the same as the bottom member 40 but oriented upside down relative to the bottom member 40. More particularly, the top member is elongated and includes a main wall 74 and a pair of face walls 76,78 extending upwardly from respective front and rear edges of the main wall 74. The top member 42 further includes a pair of support walls 80,82 extending toward one another from distal edges of the face walls 76,78. Fastener receiving structures 84,86 are provided at distal ends of the support walls 80,82 for receiving fasteners 50 and a flange 88 extends downwardly from the main wall 74. Unlike the bottom member 40, the top member 42 additionally includes a pair of flanges 90,92 extending upwardly from the support walls 80,82. A plurality of spaced holes 98 is defined on a portion of the main wall 74 between the flange 88 and the rear face wall 78.

When the lower section 14 is assembled, the holes 68,98 are generally aligned with one another. Each set of aligned holes receives one of a plurality of posts or pickets 100. As used herein, the terms "picket" and "pickets" are used only to generally refer to the elongated members 100 of the lower section 14. The pickets 100 of the present invention need not be pointed nor driven into the ground. The plurality of pickets 100 of the preferred embodiment, also referred to herein as a barrier or barrier members, are generally rigid tubular members that can have a hollow rectangular cross-section.

More specifically, each of the pickets 100 includes a lower end 102 and an upper end 104. The lower end 102 is received in one of the lower holes 68 and the upper end 104 is received in a corresponding, aligned one of the upper holes 98. As shown in FIG. 2, the aligned holes 68,98 are shaped to generally match and/or mate with the hollow rectangular cross-sections of the pickets 100. With specific reference to FIG. 7, the lower ends 102 of the pickets 100 rest upon or are supported by the rear fastener receiving structure 64. Further, the lower ends 102 extend beyond the main wall 52 of the lower member 12 and the upper ends 104 extend beyond the main wall 74 of the upper member 14.

The positioning of the holes 68,98 spaces the pickets 100 apart from one another across the lower opening 18. Further, the holes 68,98 position the pickets 100 in an orientation generally parallel to the side members 46,48 and perpendicular to the top and bottom members 12,14. As illustrated, the spacing between the pickets 100 is such that (1) a person of average size generally could not squeeze between the pickets 100, (2) airflow is not significantly impeded when passing through the opening 18 and (3) visibility through the opening 18 is not overly obstructed by the pickets 100.

One or more of the pickets 100 can be further secured to the top and bottom members 40,42. As shown in FIG. 2, selected pickets 106 of the plurality of pickets 100 can include throughholes 108 adjacent their upper and lower ends 102, 104 for receiving fasteners, such as cotter pins 110 therethrough to further secure the pickets 106 in the holes 68,98. For example, with additional reference to FIG. 3, the upper end 102 of each of the selected pickets 106 is received in its hole 98 such that its throughhole 108 is positioned beyond the main walls 74. The cotter pin 110 can then be inserted into the throughhole 108 to lock the picket 106 to the top member 42. In a similar manner, the lower end 102 of each of the selected pickets 106 can be locked or further secured to the bottom member 40 by another cotter pin 110. In the preferred embodiment shown in FIG. 2, at least two pickets 106 are secured at both ends to the bottom member 40 and top member 42 with the use of cotter pins 110 or the like.

With continued reference to FIGS. 2 and 3, a seam sealer 112 can be optionally applied between any one or more of the pickets 100 and top and bottom members 40,42. Specifically, the seam sealer 112 is positioned along portions of the pickets 100 that are adjacent the openings 68,98. One purpose of the seam sealer 112 is to prevent the pickets 100 from rattling within the holes 68,98 after installation such as might be caused by high winds or the like. Thus, the sealer 112 more firmly secures the pickets 100 to the top and bottom members 40,42.

Figure 4:
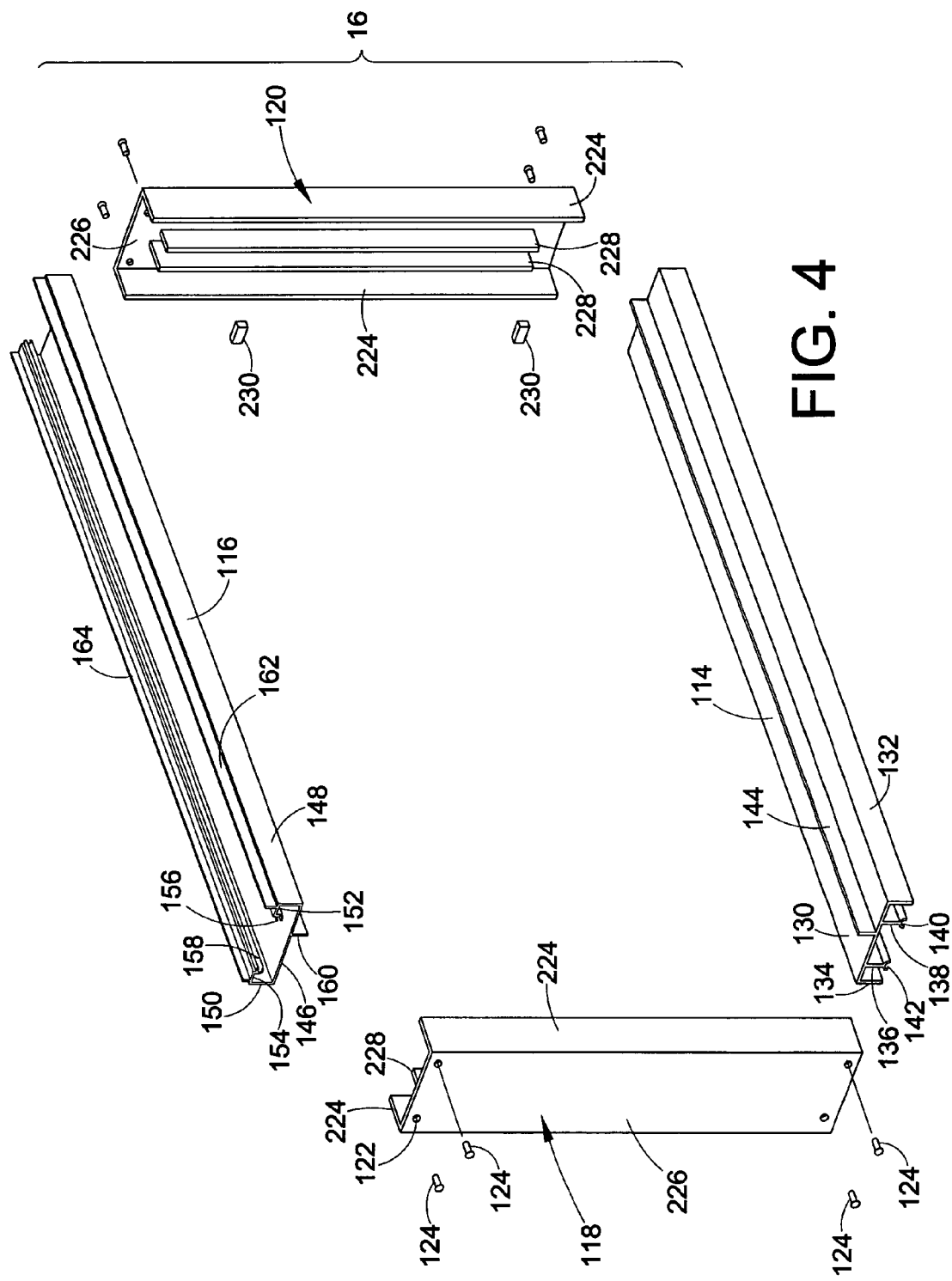
FIG. 4 is an exploded perspective view of an upper rectangular frame section of the frame assembly of FIG. 1.

With reference to FIG. 4, the upper section 16 includes a bottom member 114 and a top member 116 spaced apart from the bottom member. The upper section 16 further includes a pair of spaced apart side members 118,120 extending between the top and bottom frame members 114,116. The side members 118,120 include holes 122 that allow the side members to be secured to the top and bottom members 114,116 by conventional fasteners 124, which can be screws, rivets, bolts or the like.

More particularly, the bottom member 114 is generally elongated and includes a main wall 130 and a pair of face walls, front face wall 132 and rear face wall 134, depending downwardly from respective front and rear edges of the main wall 130. The bottom member further includes a pair of downwardly depending flanges 136,138 spaced inwardly of the walls 132, 134 and terminating in fastener receiving structures 140,142 that receive the fasteners 124. A flange 144 extends upwardly from the main wall 130 in a direction opposite of the walls 132,134.

The top member 116 is generally the same as the top member 42 except the member 116 does not include holes 98. Specifically, the top member 116 is elongated and includes a main wall 146 and a pair of face walls 148, 150 extending upwardly from respective front and rear edges of the main wall 146. The top member 116 further includes a pair of top walls 152,154 extending toward one another from distal edges of the face walls 148,150. Fastener receiving structures 156,158 for receiving the fasteners 124 are provided at distal ends of the top walls 152, 154 and a flange 160 extends downwardly from the main wall 146. The top member 116 additionally includes a pair of flanges 162,164 extending upwardly from the top walls 152,154.

Figure 5:
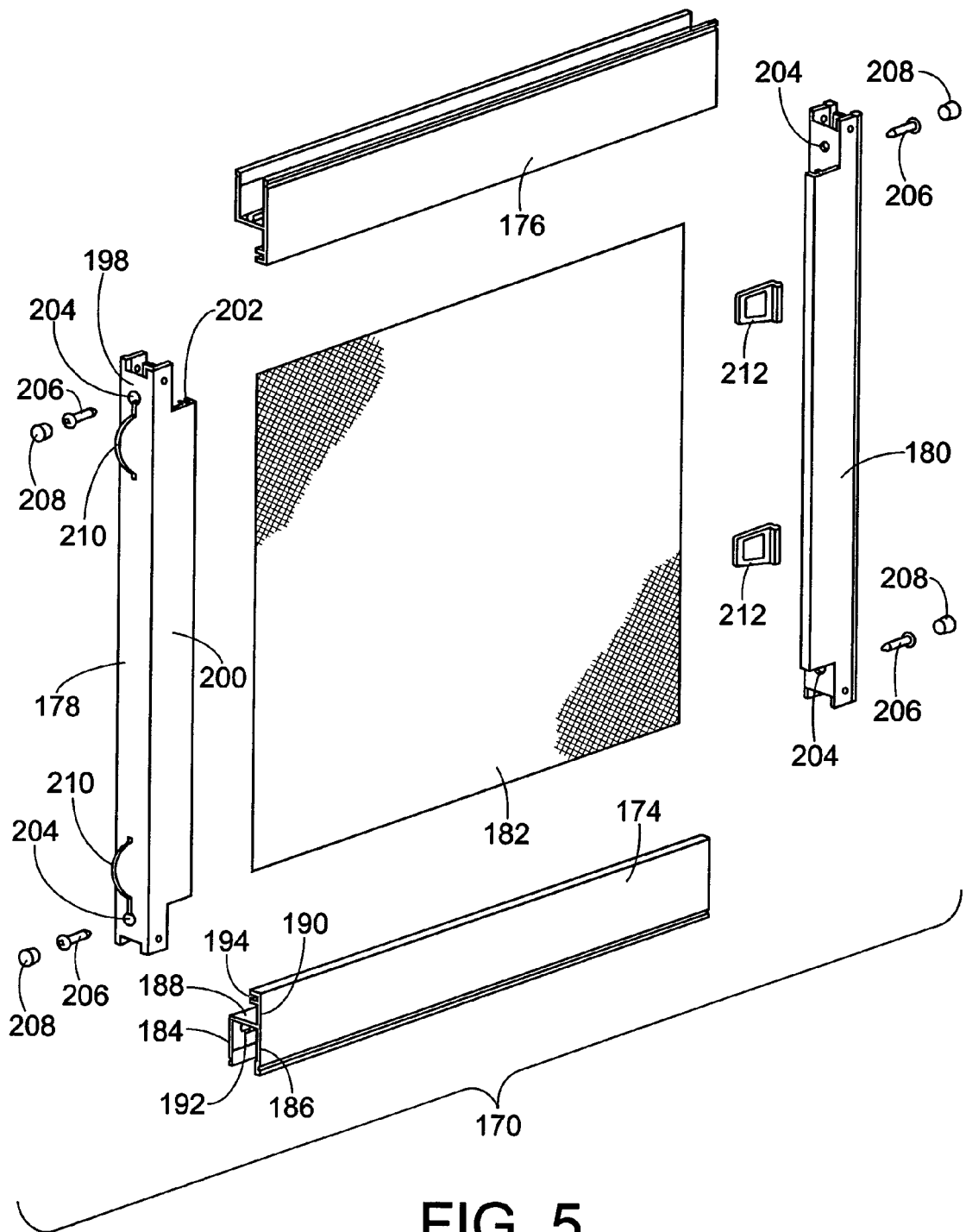
FIG. 5 is an exploded perspective view of one of two screen assemblies removably mountable within the upper and lower frame sections of the frame assembly of FIG. 1.

With reference again to FIG. 1, the frame assembly 10 includes a pair of screen assemblies 170,172 removably mounted in the upper and lower sections 14,16 and extending across the openings 18,20 of the upper and lower sections to prevent insects, small debris and the like from passing therethrough. The screen assemblies 170,172 are generally identical or nearly identical to one another. With reference to FIG. 5, only one of the screen assemblies 170 is shown exploded and will be described in further detail. It is understood that the other screen assembly 172 shares like components with the screen assembly 170 and is constructed in a like manner.

With continued reference to FIG. 5, the screen assembly 170 includes a base member 174, a top member 176 and a pair of side members 178,180. The members 174-180 form a rectangular frame adapted to hold a screen or mesh 182 tautly therebetween. More specifically, the base member 174 is generally h-shaped and includes a pair of side walls 184,186, a connecting wall 188 and an arm wall 190. Between the side walls 184,186, the connecting wall 188 includes a fastener receiving structure 192. A groove structure 194 is provided at a distal end of the arm wall 190 for receiving a spline 196 (FIG. 7) for holding the screen 182 in a groove defined by the groove structure 196. The top member 176 is generally the same as the base member 174 but oriented upside down relative to the base member 174.

Figure 8:
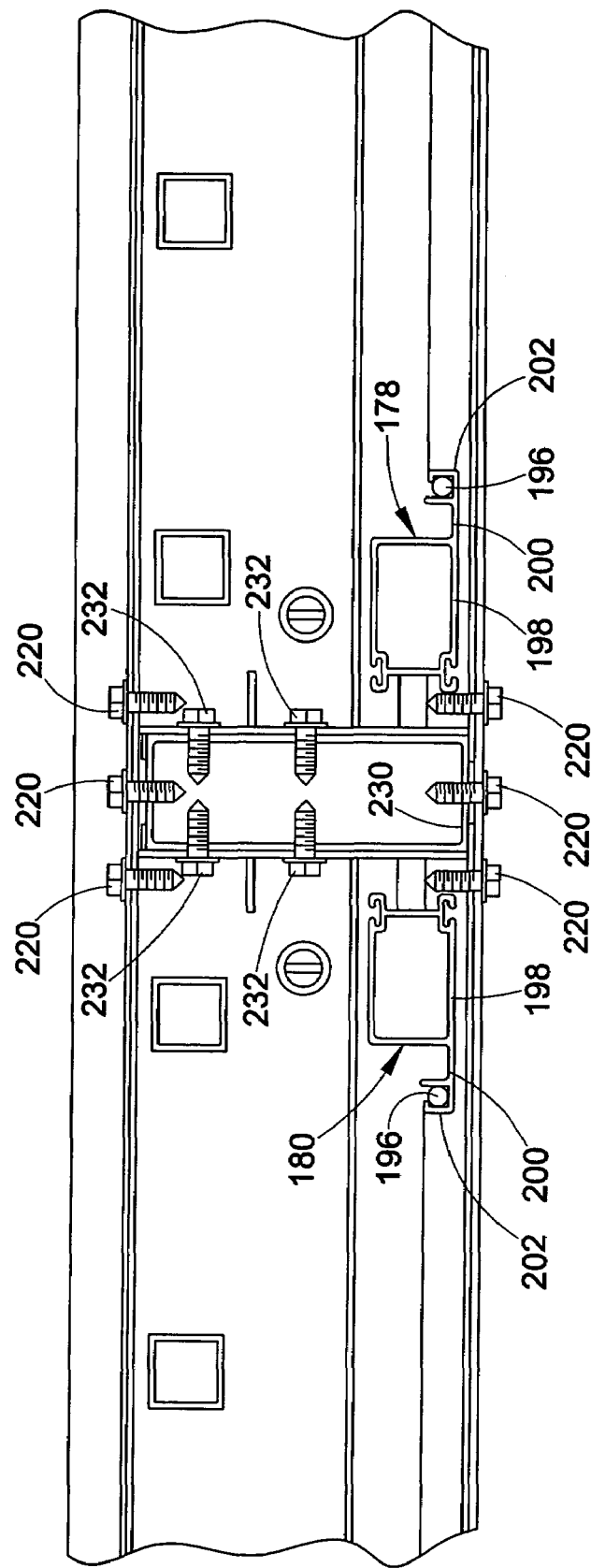
FIG. 8 is a partial top cross-sectional view of a pair of interconnected frame assemblies, each the same or similar to the frame assembly of FIG. 1.

With additional reference to FIG. 8, the side members 178,180 include hollow, rectangular portions 198 and arm walls 200 extending from the portions 198. The arm walls 200 include groove structures 202 for receiving the spline 196. As shown in FIG. 5, the rectangular portions 198 include throughholes 204 that align with the fastener receiving structures 192 of the top and base members 174,176. Fasteners 206 are received in the throughholes 204 and the fastener receiving structures 192 for securing the side members 178,180 to the top and base members 174,176. Caps 208 can be seated in the throughholes 204 over heads of the fasteners 206.

The side member 178 includes compressible leaf springs 210 along an outside wall of the rectangular portion 198 for purposes of centering the screen assembly 170 when it is installed in the lower section 14 as will be described in more detail below. Opposite the springs 210, a pair of pull tabs 212 are disposed on the side member 180. The pull tabs 212 provide a graspable structure for installing and removing the screen assembly 170 from the lower section 14 and overcoming the force of the leaf springs 210.

One of the features of the present invention is the provision of a frame assembly that can be manufactured through conventional means at a remote location and then assembled/installed on-site, i.e., the location that the frame assembly 10 is to be used such as at a residential or business location. Optionally, the lower section 14, the upper section 16 and/or the screen assemblies 170,172 can be subassembled either at a remote location or on-site.

To assemble and install the frame assembly 10, with reference to FIG. 7, the support base 12 is secured to the supporting structure 22 by bolts 24. With additional reference to FIGS. 2 and 3, the lower section 14 is assembled and connected to the supporting structure 22. More specifically, the selected pickets 106 are inserted in the holes 68 of the bottom member 40 and secured thereto by the cotter pins 110, or the like. The member 40, with at least the selected pickets 106, is nested in the supporting structure as shown in FIG. 7. The remaining pickets 100 are inserted in the holes 68. All the pickets 100 rest upon the fastener receiving structure 64 of the lower member 40.

The side members 44,46 and the top member 42 are then connected to the pickets 100 and the bottom member 40. More particularly, the pickets 100 are received through the holes 98 and the selected pickets 106 are secured thereto by the use of the cotter pins 100. The side members 44,46 are secured to the top and bottom members 40,42 by fasteners 50 passing through the holes 48 and connecting to the fastener receiving structures 62,64,80,82. With additional to FIG. 3, the seam sealer 112 can be applied around all the holes 68,98 to further secure the pickets 100 to the top and bottom members 40,42. Fasteners 220 can be used to secure the support base 12 to the bottom member 40.

With reference to FIGS. 4 and 7, the upper section 16 is assembled and connected to the lower section 14. More specifically, the fasteners 124 are used to connect the side members 118,120 to the top and bottom members 114,116. Like the lower section 14, the fasteners 124 pass through the holes 122 in the side members 118,120 and are connected to the fastener receiving structures 140,142,156,158. The upper section 16 is connected to the lower section 14 by fasteners 222. With specific reference to FIG. 7, the fasteners 222 pass through the face walls 132,134 of the upper section bottom member 114 and pass through the flanges 90,92 of the lower section to member 42.

The screen assemblies 170,172 are subassembled prior to installation in the frame assembly 10. More specifically, with reference to FIG. 5, the side members 178,180 are connected to the top and bottom members 174,176 by the fasteners 206. The fasteners 206 pass through the holes 204 and connect to the screw receiving structures 192 of the top and bottom members 174,176. The caps 208 are then installed over the heads of the fasteners 206. With the frame 174-180 assembled, the screen 182 is installed in a conventional manner using the spline 196 (FIGS. 7 and 8).

The assembled screen assemblies 170,172 are removably installed in respective upper and lower sections 14,16. As shown in FIG. 4, the side members 44,46,118,120 include outer face walls 224 extending from main walls 226 and interior flange walls 228 extending from the main walls 226 spaced apart from the outer face walls 224. The walls 224-228 define tracks for receiving and positioning the screen assemblies 170,172. Optionally, with reference to FIGS. 2 and 4, pads 230 can be adhesively connected to the side members 44,46,118,120 within the defined tracks for engaging and seating the screen assemblies 170,172. The screen assemblies 170,172 are installed in a conventional manner and are readily removably from the upper and lower sections 14,16.

With reference again to FIG. 1, the assembled frame assembly 10 is shown. The pickets 100 and the members 42,114 together form a railing assembly or balustrade across the frame assembly 10 which partially obstructs the opening through the frame assembly 10. Specifically, the members 42,114 form a rail or railing of the railing assembly and the pickets 100 form vertical posts or elongated beams that support the rail. Thus, the frame assembly 10 provides a frame structure capable of screening-in an outdoor floor structure and simultaneously providing a barrier or railing assembly along the floor structure.

Figure 6:
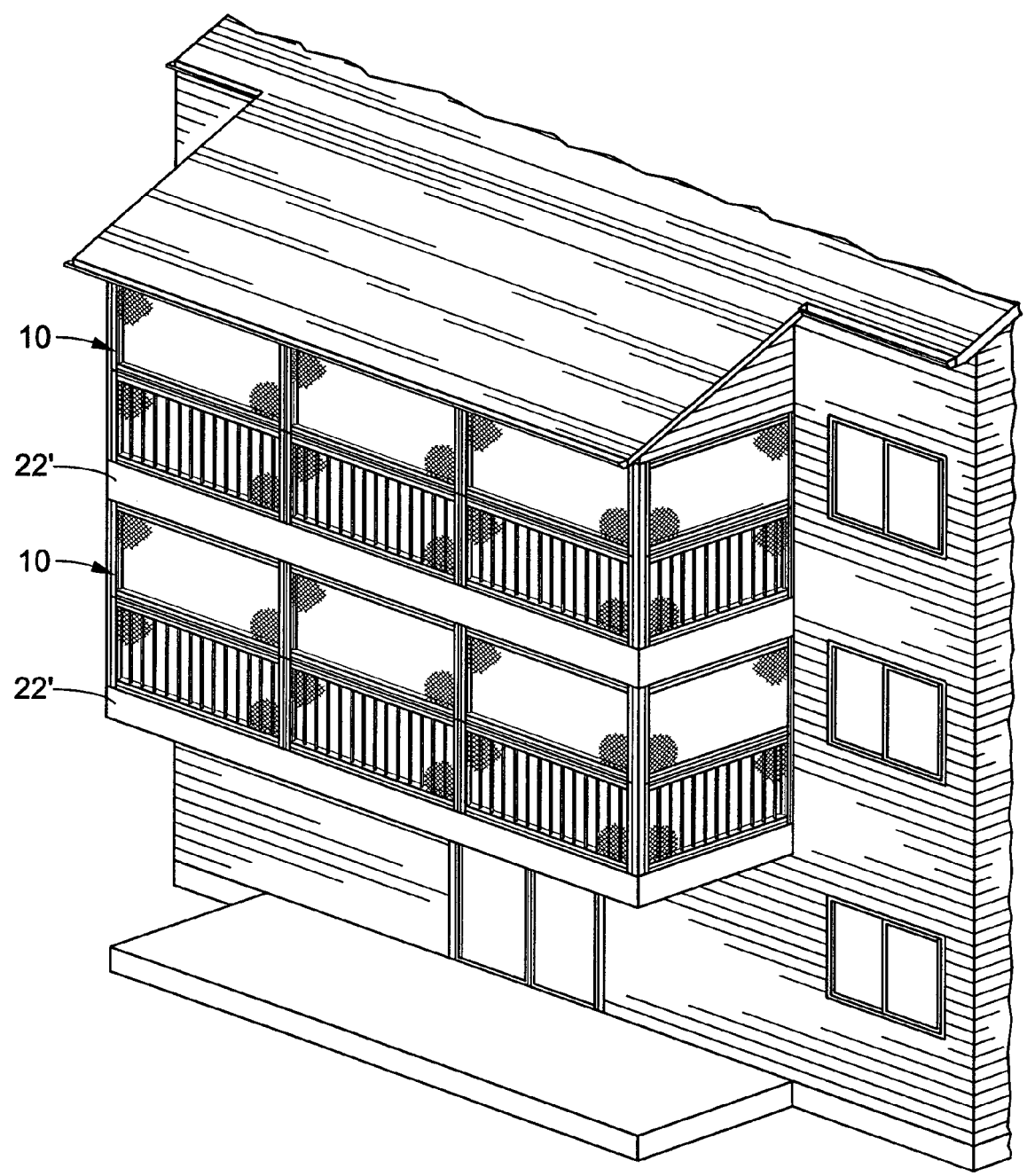
FIG. 6 is a perspective view of several frame assemblies, each the same or similar to the frame assembly of FIG. 1, used to partially enclose a raised floor structure.

The frame assembly 10 shown in FIG. 1 is modular in that it can be combined with several other frame assemblies to provide enclosing wall sections on a raised structure or floor. With additional reference to FIG. 6, a typical installation may include several frame assemblies 10 connected linearly or at various angles relative to one another. FIG. 6 illustrates a pair of raised floor structures or porches 22' extending from a building. The screen assemblies 10 are secured to the floor structures 22' along exposed exterior edges thereof to screen in the floor structures and simultaneously provide a barrier along the raised floor structures.

With reference to FIG. 8, one means of connecting two frame assemblies 10 together is shown for illustrative and nonlimiting purposes only. In FIG. 8, a connecting member 230 is used between two adjacent frame assemblies 10. The connecting member 230 is an elongated and rectangular hollow beam that is connected to the adjacent frame assemblies 10 and the support base 12 by suitable fasteners, such as screws 232 and the screws 220. The size of the connecting member 230 enables the threaded bodies of the screws 232 to be remain hidden thereby providing a more refined or finished appearance. It is contemplated that adjacent frame assemblies could be connected together in other ways using other components and/or connectors. For example, a modified connecting member could be used to connect two frame assemblies together at a corner junction of a floor or at some other angle.

The invention has been described with reference to a preferred embodiment. Obviously, modifications and alterations will occur to others upon reading and understanding the preceding detailed description. It is intended that the invention be construed as including all such modifications and alterations as come within the scope of the appended claims or the equivalents thereof.

Having thus described the preferred embodiment, the invention is now claimed to be:

1. A frame assembly for at least partially enclosing an associated raised floor structure, said frame assembly comprising:
   a bottom frame member positioned adjacent the associated raised floor structure;
   a pair of spaced apart side frame members connected to and extending upwardly from said bottom frame member;
   a top frame member spaced from the bottom frame member, and connected to said pair of side frame members;
   at least one picket extending between and connected to said top and bottom frame members, said at least one picket being oriented approximately parallel to said side frame members;
   wherein at least one of said bottom frame member and said top frame member includes spaced holes for receiving opposed ends of said at least one picket for connection thereto; and
   a screen selectively mounted to at least one of said top and bottom frame members, and said side frame members, said screen extending over said at least one picket.

2. The frame assembly of claim 1 wherein said at least one picket comprises a rigid tubular member.

3. The frame assembly of claim 1 wherein said at least one picket comprises a rigid member having a hollow rectangular cross-section.

4. The frame assembly of claim 3 wherein said at least one picket comprises a plurality of spaced aligned pickets.

5. A frame assembly for at least partially enclosing an associated raised floor structure, said frame assembly comprising:
   a bottom frame member positioned adjacent the associated raised floor structure;
   a pair of spaced apart side frame members connected to and extending upwardly from said bottom frame member;
   a top frame member spaced from said bottom frame member, and connected to said pair of side frame members;
   at least one picket extending between and connected to said top and bottom frame members, said at least one picket being oriented approximately parallel to said side frame members, at least one of said bottom frame member and said top frame member includes spaced holes for receiving opposed ends of said at least one picket for connection thereto;
   a screen selectively mounted to at least one of said top and bottom frame members and said side frame members and being located adjacent said at least one picket; and
   at least one fastener received through a hole in one end of one of the at least one picket received in said spaced holes for securing said at least one picket to at least one of said bottom frame member and said top frame member.

6. The frame assembly of claim 5 wherein both said bottom frame member and said top frame member include said spaced holes and said at least one fastener includes two upper fasteners received through holes in upper ends of two spaced pickets received in said top frame member and two lower fasteners received through holes in lower ends of two pickets received in said bottom frame member.

7. The frame assembly of claim 1 further comprising a layer of a seam sealer positioned between said ends of said at least one picket and said top and bottom frame members to prevent said at least one picket from rattling.

8. The frame assembly of claim 1 wherein said screen comprises a pair of removable screen panels, one of said screen panels being held between said bottom and top frame members and said side frame members on one side of said at least one picket and the other of said screen panels being held between said bottom and top frame members and said side frame members on another side of said at least one picket.

9. The frame assembly of claim 8 wherein said screen panels include compressible leaf springs and are held between said side frame members in tracks defined in said side frame members.

10. The frame assembly of claim 9 wherein said side frame member tracks include bumpers for engaging said screen panels.

11. A screen assembly having an integral railing comprising:
   a lower rectangular frame section having a base member and a top member spaced from said base member;
   a plurality of spaced barrier members extending from said base member to said top member, said spaced barrier members and said top member together forming a railing;
   a first screen held in the lower rectangular frame section adjacent said railing;
   an upper rectangular frame section supported by said lower rectangular frame section; and
   a second screen held in the upper rectangular frame section.

12. The screen assembly of claim 11 further including:
   a third screen held in the lower rectangular frame section adjacent said railing, said third screen being held on one side of said plurality of pickets and said first screen being held on the other side of said plurality of pickets.

13. A combination screen and railing frame assembly comprising:
   a frame defining an opening therethrough;
   at least one screen panel, which includes a screen frame and a screen disposed over a screen frame opening of said screen frame, secured to said frame such that said screen of said at least one screen panel extends across at least part of said opening of said frame; and
   a balustrade connected to said frame, said balustrade including:
      a horizontal member extending across said opening and being spaced a preselected distance from a bottom portion of said frame, and
      a plurality of spaced pickets extending across at least part of said opening, each of said plurality of spaced pickets connected at one end to said horizontal member and at another end to said bottom portion of said frame.

14. The combination screen and railing frame assembly of claim 13 wherein said at least one screen panel includes:
   a first screen panel having a first screen extending across a first portion of said opening defined below said horizontal member;
   a second screen panel having a second screen extending across a second portion of said opening defined above said horizontal member.

15. The combination screen and railing frame assembly of claim 14 wherein at least one of said first and second screen panels are removably mounted to said frame.

16. A frame assembly for screening in a floor structure and providing an integral rail therewith, said frame assembly comprising:
   a bottom frame section;
   a first pair of spaced apart side frame sections extending upwardly from said bottom frame section;
   a first intermediate frame section spaced from said bottom frame section and extending between said first pair of side frame sections;
   a plurality of spaced pickets extending between said bottom frame section and said first intermediate frame section, said plurality of pickets and said first intermediate frame section forming a rail;
   a first removable screen panel held between said bottom frame section, said first side frame sections and said first intermediate frame section, said first screen panel being disposed on one side of said plurality of pickets, said first removable screen panel including a first rectangular frame and a first screen disposed across an opening of said first rectangular frame;
   a second intermediate frame section connected to said first intermediate frame section and further forming said rail;
   a second pair of spaced apart side frame sections extending upwardly from said second intermediate frame section;
   a top frame section connected to said second pair of side frame sections; and
   a second removable screen panel held between said second intermediate frame section, said second pair of side frame sections and said top frame section, said second removable screen panel including a second rectangular frame and a second screen disposed across an opening of said second rectangular frame.

17. The frame assembly of claim 16 wherein said plurality of pickets comprise rigid tubular components that provide rigidity to said rail.

18. The frame assembly of claim 16 wherein said plurality of pickets are spaced apart from one another a distance sufficient to allow substantially unobstructed airflow through said first removable screen.

19. The frame assembly of claim 16 wherein said bottom frame section and said first intermediate section include sets of aligned holes that each receive ends of each of said plurality of pickets.

20. The frame assembly of claim 19 further comprising a layer of a sealant material disposed between said ends of said pickets and said bottom frame section and first intermediate section to retard rattling of said pickets in said frame assembly.

21. The frame assembly of claim 16 wherein at least two of said plurality of pickets are secured in said sets of aligned holes by fasteners.

22. A method of assembling a frame assembly having a railing, said method comprising the steps of:
   inserting first ends of a plurality of pickets into a first plurality of spaced openings on a bottom frame member;
   inserting second ends of said plurality of pickets into a second, aligned plurality of spaced openings on a top frame member;
   attaching a first side frame section to said bottom frame member and said top frame member adjacent a first one of said plurality of pickets; and
   attaching a second side frame section to said bottom frame member and said top frame member adjacent a last one of said plurality of pickets.

23. The method of claim 22 further including the step of:
   installing a first screen panel on one side of said pickets between said first and second side frame sections.

24. The method of claim 23 further including the step of:
   installing a second screen panel on another side of the pickets between said first and second side frame sections.

25. The method of claim 22 further including the steps of:
   connecting a second bottom frame member to said top frame member;
   attaching a third vertical frame section to said second bottom frame member adjacent said first one of said plurality of pickets and to a second top frame member spaced from said second bottom frame member; and
   attaching a fourth vertical frame section to said second top frame member adjacent said last one of said plurality of pickets and to said second top frame member.

26. The method of claim 25 further including the steps of:
   installing a first screen panel between said first and second side frame sections; below the second bottom frame member; and
   installing a second screen panel between said first and second side frame sections above the second bottom frame member.

* * * * *